United States Patent
Ward et al.

(10) Patent No.: US 10,713,057 B2
(45) Date of Patent: Jul. 14, 2020

(54) MECHANISM TO STOP COMPLETIONS USING STOP CODES IN AN INSTRUCTION COMPLETION TABLE

(71) Applicant: International Business Machines Corporation, Armonk, NY (US)

(72) Inventors: Kenneth L. Ward, Austin, TX (US); Dung Q. Nguyen, Austin, TX (US); Susan E. Eisen, Round Rock, TX (US); Christopher M. Mueller, Round Rock, TX (US); Joe Lee, Round Rock, TX (US); Deepak K. Singh, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 16/110,178

(22) Filed: Aug. 23, 2018

(65) Prior Publication Data
US 2020/0065110 A1    Feb. 27, 2020

(51) Int. Cl.
*G06F 9/30*    (2018.01)
*G06F 9/38*    (2018.01)

(52) U.S. Cl.
CPC ................. *G06F 9/3836* (2013.01)

(58) Field of Classification Search
None
See application file for complete search history.

(56) References Cited

U.S. PATENT DOCUMENTS

| | | | |
|---|---|---|---|
| 6,148,394 A | 11/2000 | Tung et al. | |
| 6,237,088 B1 | 5/2001 | Zaidi | |
| 6,651,151 B2 * | 11/2003 | Palanca | G06F 9/30047 711/158 |
| 7,254,700 B2 * | 8/2007 | Levitan | G06F 9/3804 712/205 |
| 9,116,719 B2 * | 8/2015 | Martinez | G06F 8/4434 |
| 10,572,264 B2 * | 2/2020 | Silberman | G06F 9/3851 |

FOREIGN PATENT DOCUMENTS

WO    0070469 A2    11/2000

* cited by examiner

*Primary Examiner* — Corey S Faherty
(74) *Attorney, Agent, or Firm* — Patterson + Sheridan, LLP

(57) ABSTRACT

Method and apparatus for stopping completions using stop codes in an instruction completion table are provided by during a first clock cycle, in response to determining that a given entry in an Instruction Completion Table (ICT) is finalized and is associated with a stop code, completing, according to a program order, instructions included in one or more finalized entries of the ICT located in the ICT before the given entry; during a second clock cycle, after completing the instructions, performing exception processing for a special instruction included in the given entry; and during a third clock cycle, after processing the special instruction, completing, according to the program order, additional instructions in one or more finalized entries located in the ICT after the given entry.

20 Claims, 3 Drawing Sheets

US 10,713,057 B2

MECHANISM TO STOP COMPLETIONS USING STOP CODES IN AN INSTRUCTION COMPLETION TABLE

BACKGROUND

The disclosure relates to processors, and more specifically, to improvements in the functionality thereof in the handling of stop codes. Stop codes indicate instructions that involve special handling, and disrupt the normal program order of completion of sequential instructions by the processor.

SUMMARY

According to one embodiment of the present invention, a method to stop completions using stop codes in an instruction completion table is provided, the method comprising: during a first clock cycle, in response to determining that a given entry in an Instruction Completion Table (ICT) is finalized and is associated with a stop code, completing, according to a program order, instructions included in one or more finalized entries of the ICT located in the ICT before the given entry; during a second clock cycle, after completing the instructions, performing exception processing for a special instruction included in the given entry; and during a third clock cycle, after processing the special instruction, completing, according to the program order, additional instructions in one or more finalized entries located in the ICT after the given entry.

In another embodiment of the present invention, a system to stop completion using stop codes in an instruction completion table is provided, the system comprising: A system, comprising: a computational unit; an Instruction Completion Table (ICT), including a plurality of entries; a controller, in communication with the computational unit and the ICT, configured to: during a first clock cycle, in response to determining that a given entry in an Instruction Completion Table (ICT) is finalized and is associated with a stop code, completing, according to a program order, instructions included in one or more finalized entries of the ICT located in the ICT before the given entry; during a second clock cycle, after completing the one or more instructions, perform exception processing for a special instruction included in the given entry; and during a third clock cycle, after processing the special instruction, complete older instructions in one or more finalized entries in the ICT after the given entry.

In a further embodiment of the present invention, a computer-readable storage medium having computer-readable program code to stop completion using stop codes in an instruction completion table is provided, the computer program product comprising: a computer-readable storage medium having computer-readable program code embodied therewith, the computer-readable program code executable by one or more computer processors to: during a first clock cycle, in response to determining that a given entry in an Instruction Completion Table (ICT) is finalized and is associated with a stop code, completing, according to a program order, instructions included in one or more finalized entries of the ICT located in the ICT before the given entry; during a second clock cycle, after completing the one or more instructions, perform exception processing for a special instruction included in the given entry; and during a third clock cycle, after processing the special instruction, complete older instructions in one or more finalized entries in the ICT after the given entry.

DETAILED DESCRIPTION

Figure 1:
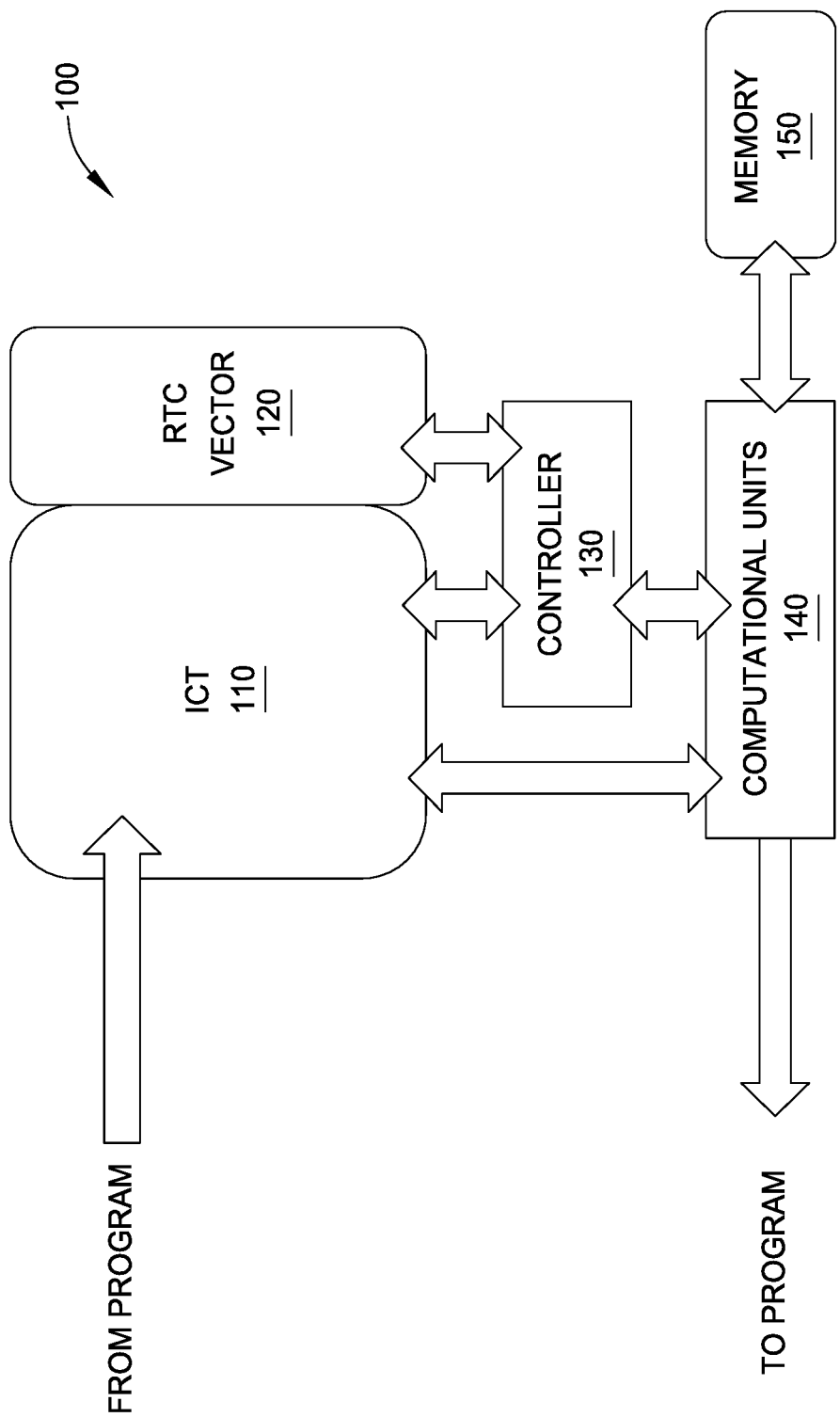
FIG. 1 illustrates a microprocessor unit, according to aspects of the present disclosure.

Modern processors may complete multiple instructions per clock cycle. These processors may issue and finish instructions out of order relative to the order specified in a program using those instructions (a program order), and may have many instructions in-process at any given time. To ensure that the instructions complete in program order, despite being handled in a potentially different order by the processor, the instructions are tracked in an Instruction Completion Table (ICT). The ICT for a processor may include references for several instructions in the program order for those instructions, and the statuses of those instructions. In some embodiments, a tail pointer is maintained to point to the oldest non-finished instruction in the ICT so that the processor may complete all instructions stored in the ICT before (relative to the program order) the pointed-to instruction.

Some special instructions in an instruction set may have effects in the system that use system resources differently than other instructions, and the system pauses in the program order to handle these special instructions. For example, to properly handle a special instruction to flush all younger (in the program order) instructions from the system, the system may mark the special instruction as finished, but does not complete the special instruction until the system determines that the younger instructions have been flushed. Other examples of special instructions include, but are not limited to: sync (synchronization) instructions, debug instructions, diagnostic functions, interrupt handler instructions, and the like.

To improve the functionality of computing devices using instruction sets with special instructions that are known to involve special processing, one or more stop bits are maintained in the ICT and/or an associated Ready to Complete (RTC) vector. The stop bits may be set at dispatch time for the instruction or may be set at finish time. When the instructions in an entry are finished, the processor may set a finished status bit to indicate that the instructions in the entry are ready for completion. If stop bits are also set for the entry, the processor when attempting to complete the instructions in the entry will stop completion of those instructions until a stop condition is resolved, and the stop bits are cleared.

As used herein, numbers in bases other than base ten are identified with a subscript identifying the base that should be used to interpret the number. For example, the number 11 will be understood to be a base ten representation of eleven, while $11_2$ will be understood to be a base two representation of three, while $11_{16}$ will be understood to be a base sixteen (hexadecimal) representation of seventeen. Examples given in the present disclosure that refer to an index or a position of a given value in an array or matrix shall begin at 1 (rather than 0), and the teachings provided by the present disclosure may be applied in embodiments using different indexing and/or ordering schemes than used in the examples.

With reference now to FIG. 1, a microprocessor unit 100 is illustrated, as may be part of a computing device. An ICT 110 is organized as a circular list with each entry in the ICT 110 tracking a one or more instructions for the microprocessor unit 100 to track whether those instructions are ready for completion. Once an entry is completed, the instructions in that entry may be flushed so that the ICT 110 may reuse those entries for later instructions. The ICT 110 orders how the instructions are assigned to the entries in program order, although the individual instructions may be handled in any order. The program order specifies that an instruction held in an earlier entry is to be completed before an instruction held in a later entry for the orderly use of a program using the microprocessor unit 100 to perform calculations and hardware commands on behalf of that program.

A RTC vector 120 is associated with the ICT 110 such that each entry in the RTC vector 120 is associated with the statuses of the entries in the ICT 110. The RTC vector 120 provides a controller 130 in communication with the ICT 110 and computational unites 140 in the microprocessor unit 100 with knowledge of the instructions stored in the ICT 110 without needing to query the ICT 110 directly.

The instructions in the ICT 110 are processed by the computational units 140, and may read or write from various memory 150 in the microprocessor unit 100 or external to the microprocessor unit 100, including registers, storage devices, sensors, and other external devices. Once the computational units 140 have finished a given instruction, the controller 130 may update the ICT 110 and/or the RTC vector 120 to reflect that the given entry has instructions that are are finished and ready for completion. The controller 130 may then signal the computational units 140 to complete the instructions in the associated entries when the order and status of the entries in the ICT 110 allows for completion in program order.

Figure 2:
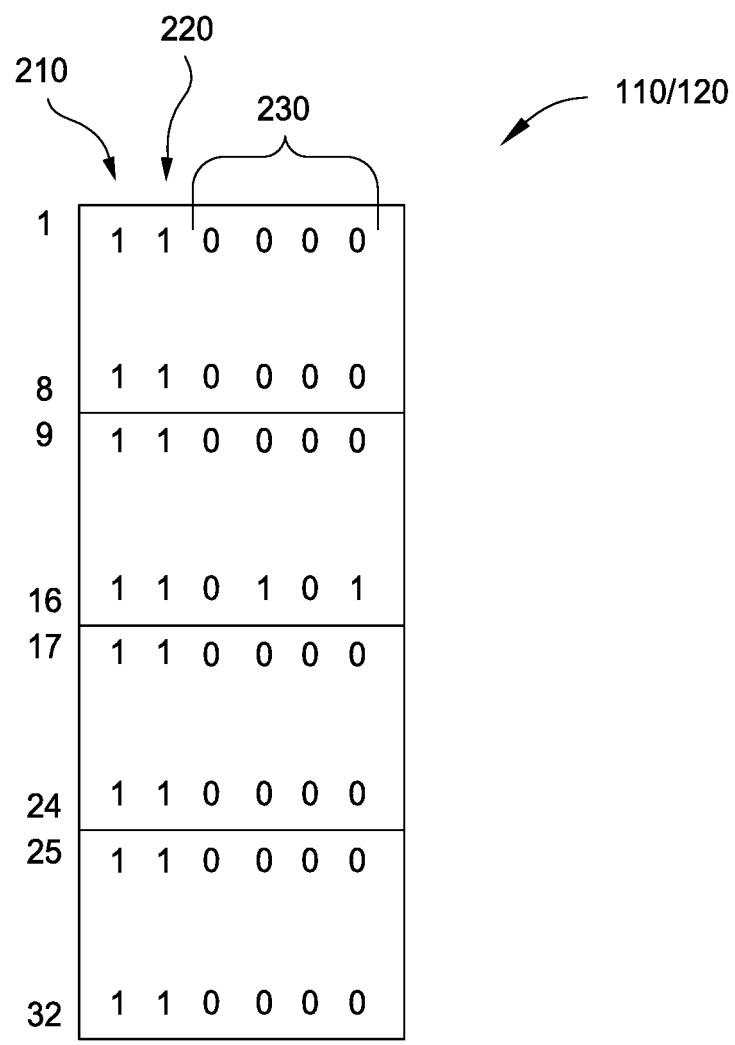
FIG. 2 illustrates an example Instruction Completion Table or corresponding Ready to Complete vector that includes several status bits for the instructions included in each entry of the Instruction Completion Table, according to aspects of the present disclosure.

FIG. 2 illustrates an example ICT 110 (or RTC vector 120) that includes several status bits for the instructions included in each entry of the ICT 110. The illustrated ICT 110 has 32 entries, divided into four 8-entry segments, but in other embodiments an ICT 110 may include more or fewer entries divided into more or fewer sections with more or fewer entries in each segment than in the illustrated example. Additionally, the status bits for some of the entries are omitted from illustrated views, but each entry in the ICT 110 is associated with status bits that track the finished/non-finished status and stop codes of the associated instructions. For purposes of the examples given herein, unless indicated otherwise, the dispatched status bits 210 for the non-illustrated entries may be assumed to be set to $1_2$ (indicating that the associated instructions have been sent for processing), the finished status bit 220 for the non-illustrated entries may be assumed to be set to $1_2$ (indicating that the associated instructions are ready for completion) and the stop status bits 230 for the non-illustrated may be assumed to be set to $0_2$ (indicating that the associated instructions are non-special, and do not require special handling before completion of that instruction or later instruction in the ICT 110).

A dispatched status bit 210 indicates whether the instruction(s) in a given entry have been dispatched for processing at the one or more computational units 140. In embodiments that include more than one instruction in each entry in an ICT 110, a dispatched status bit 210 is set to $0_2$ when at least one instruction is awaiting dispatch, and is set to $1_2$ when all of the included instructions have been dispatched to the computational units 140.

A finished status bit 220 indicates whether the instruction(s) in a given entry have been finalized by the computational units 140 and are ready for completion. In embodiments that include more than one instruction in each entry of an ICT 110, a finished status bit 220 is set to $0_2$ when at least one instruction is not finished, and is set to $1_2$ when all of the included instructions have been finalized to the computational units 140.

One or more stop status bits 230 indicate whether the instruction(s) in a given entry include special instructions that use a stop in the program order to ensure proper completion. In embodiments that use several stop status bits 230, the arrangement of stop status bits 230 may indicate an identity or class of the special instruction. The embodiment illustrated in FIG. 2 uses four stop status bits 230a-d that may indicate up to sixteen different identities/types of special instructions. For example, the stop status bits 230a-d set to $0000_2$ may indicate that no stop condition is associated with the entry, such as, for example, when the instructions included in the entry are not special instructions or are special instructions whose stop condition has been cleared. In another example, the stop status bits 230a-d when set to $0001_2$ may indicate that the entry includes a special instruction for flushing younger completed entries from the ICT 110, whereas the stop status bits 230a-d when set to $1100_2$ may indicate that the entry includes a sync instruction. Various embodiments may assign (or reserve) various combinations of the stop status bits 230 to indicate various stop conditions and more or fewer than four stop status bits 230 may be used.

In embodiments that use an ICT 110 that includes more than one instruction per entry, the stop status bits 230 are set when at least one instruction in an entry is a special instruction. For example, in an ICT 110 including two instructions per entry, the stop status bits for an entry with a non-special instruction and a special instruction of type X shall be set to indicate type X. In another example, in an ICT 110 including two instructions per entry, the stop status bits for an entry with a special instruction of type Y and a special instruction of type X may be set to indicate type Y, type X, or a status indicating multiple different special instructions are included in the entry. In a further example, in an ICT 110 including two instructions per entry, the stop status bits for an entry with a first special instruction of type X and a second special instruction of type X may be set to indicate type X or a status indicating that multiple special instructions are included in the entry.

When clearing the stop status bits 230, the controller 130 resets the stop status bits 230 to $0000_2$ or another code associated with allowing the computational units 140 to continue processing the instructions in program order. In embodiments that use an ICT 110 that includes multiple instructions per entry, the controller 130 may examine a second (or later) instruction in the entry when clearing a stop code in the stop status bits 230 for a first instruction to determine whether to replace the stop status bits 230 with a second stop code. For example, in an ICT 110 including two instructions per entry, the stop status bits 230 for an entry with a special instruction of type Y and a special instruction of type X may be initially set to indicate type Y, and once cleared, reset to indicate type X, and once both of the special instructions are handled, cleared to $0000_2$ (or other code to proceed). In another example, in an ICT 110 including two instructions per entry, the stop status bits 230 for an entry with a special instruction of type Y and a special instruction of type X may be initially set to indicate type Y, and is not cleared to $0000_2$ (or other code to proceed) until the special processing for both instructions is complete.

In the illustrated example, instruction 16 is associated with stop status bits 230 indicating a stop code of $0101_2$. Although entries 1 through 32 all indicate (via associated dispatched status bits 210) that the associated instructions have been dispatched for processing, and that the associated instructions (via the associated finished status bits 220) are ready for completion, the controller 130 may allow completion of events 1 through 15 and prevent completion of entries 16 through 32 until the stop code has been cleared at entry 16.

Figure 3:
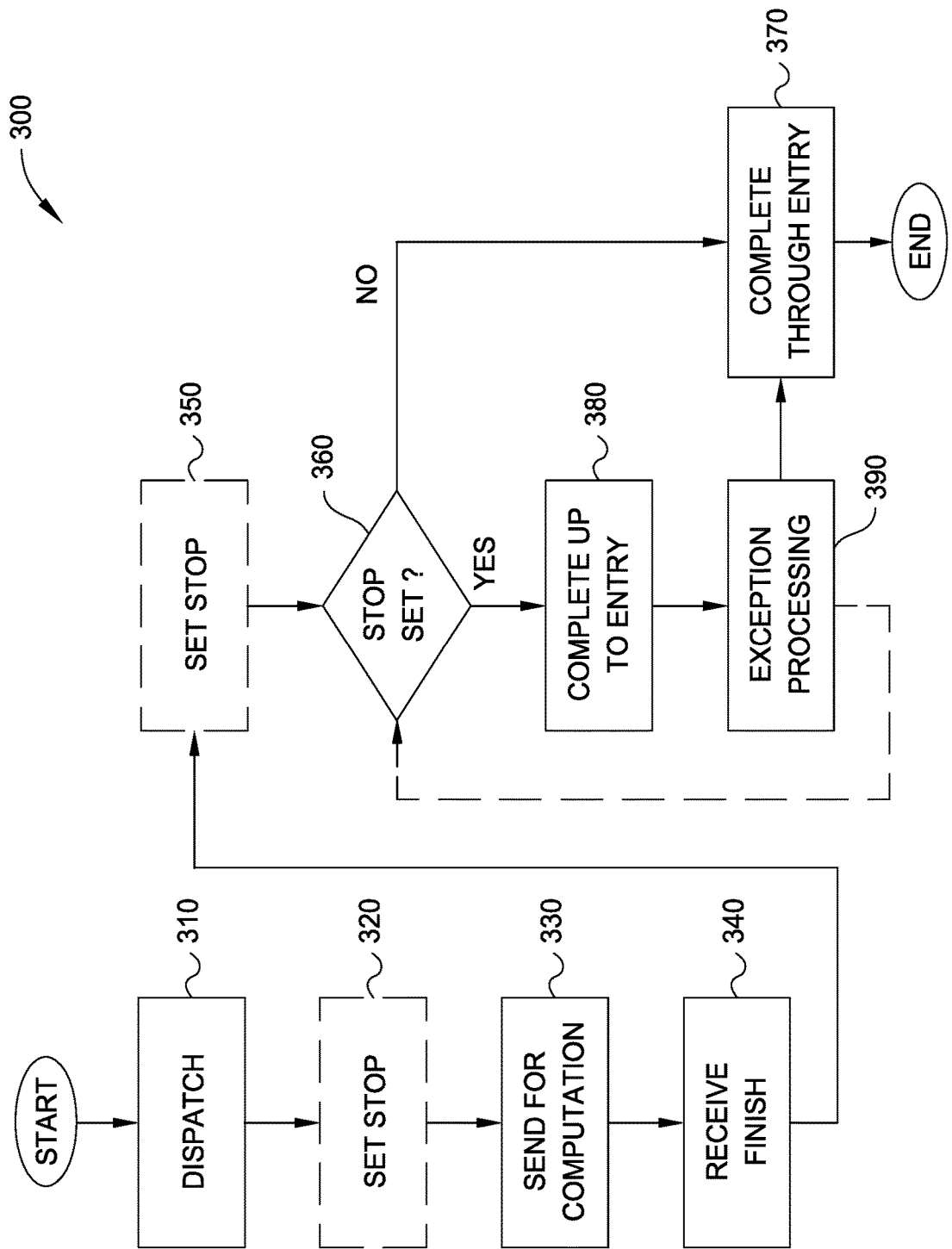
FIG. 3 is a flowchart of an example method using stop status bits to handle special instructions, according to aspects of the present disclosure.

FIG. 3 is a flowchart of an example method 300 using stop status bits 230 to handle special instructions. Method 300 begins at block 310, where the controller 130 dispatches an instruction for processing at the computational units 140.

At block 320, the controller 130 may determine, based on the identity of the instruction, whether the instruction is a special instruction that is assigned a stop code at dispatch. If the instruction is identified as a special instruction, the controller 130 may set the stop code associated with the instruction for the entry in the ICT 110 that includes the instruction. In some embodiments, the controller 130 may not set the stop code for a special instruction when the stop code has already been set for another instruction included in the entry, when the identity of the instruction indicates that the stop code is to be (potentially) set at finish (e.g., at block 350) rather than at dispatch, etc. If the instruction is not identified as a special instruction, the controller 130 may leave the stop code unset (e.g., set to zero or another code indicating that completion of the instructions in the program order is not to be paused for special handling).

At block 330, the controller 130 sends the instruction to the computational units 140 for computation. When the controller 130 sends an instruction to the computational units 140, that instruction is considered to be non-finished, and the controller 130 may set a dispatched status bit 210 for an associated entry in the ICT 110 to track the non-finished status of the instruction(s) in the entry. The instructions may be sent to the computational units 140 for computation in any (or no particular) order, and the setting of the dispatched status bit 210 allows the controller 130 to track which entries have had the associated instructions sent for computation.

At block 340, the controller 130 receives notification from the computational units 140 that the instruction dispatched at block 330 is finished, and ready to complete. At this point, the instruction is no longer considered non-finished, but ready to complete, and the controller may set a finalized status bit 220 for the associated entry in the ICT 110 to track the ready-to-complete status of the instruction(s) in the entry. Although the instructions may be sent to the computational units 140 for computation in any (or no particular) order, the instructions are to be completed in the program order in which the instructions are held in the ICT 110. The controller 130 tracks which instructions to send for completion based on the order of the instructions in the ICT 110 and the status of the finalized status bit 220. For example, if entries 1 through 5 and 7 through 32 are noted as ready to complete, but entry 6 is noted as not ready to complete, the controller 130 may allow entries 1 through 5 to complete during a given clock cycle, but will wait for entry 6 to be ready to complete before allowing entries 6 onward to complete in a later clock cycle.

At block 350, the controller 130 may determine, based on the identity of the instruction, whether the instruction is a special instruction that is assigned a stop code after finalization. If the instruction is identified as a special instruction, the controller 130 may set the stop code associated with the instruction for the entry in the ICT 110 that includes the instruction. In some embodiments, the controller 130 may not set the stop code for a special instruction after finalization when the stop code was already set at dispatch (per block 320), when the stop code has already been set for another instruction included in the entry, if the stop condition for the special instruction has already been cleared, etc. If the instruction is not identified as a special instruction, the controller 130 may leave the stop code unset (e.g., set to zero or another code indicating that completion of the instructions in the program order is not to be paused for special handling).

At block 360, the controller 130 determines, during a given clock cycle, whether an entry that is otherwise noted as being ready to complete (e.g., a finished status bit 220 is set to $1_2$) has a stop code currently set. If the controller 130 determines that the entry is not associated with a currently set stop code, method 300 proceeds to block 370. If the controller 130 determines that the entry determines that the entry is associated with a currently set stop code, method 300 proceeds to block 380.

At block 370, the controller 130 allows instructions to complete in the program order through the entry. Completing each entry in the ICT 110 in the program order completes the older instructions before the younger instructions based on the position at which the instructions were added to the ICT 110. For example, the instructions included in entry n of the ICT 110 are completed before the instructions in entry n+1, which in turn are completed before the instructions in entry n+2, etc. when the instructions are completed in program order. In some embodiments, the controller 130 may further control the number of instructions completed in a given clock cycle (e.g., via a completion window, allowing up to Y entries to be completed). Method 300 may then conclude.

At block 380, the controller 130 allows instructions to complete in the program order up to the entry determined to have a stop code associated therewith (per block 360). Completing each entry in the ICT 110 in the program order completes the older instructions before the younger instructions based on the position at which the instructions were added to the ICT 110, but the stop code prevents completion of the entry or younger entries in the ICT 110 until the stop code is cleared. For example, if entries 1 through 32 of an ICT 110 are marked as ready to complete, a controller 130 may indicate that entries 1 through 32 may be completed in a given clock cycle. However, if entry 16 is associated with a currently set stop code, the controller 130 may indicate that entries 1 through 15 (i.e., up to entry 16) may be completed in a first clock cycle, but the instructions included in entry 16 and later (despite being otherwise ready to complete) are to wait for completion until the stop code associated with entry 16 is cleared.

At block 390, the controller 130 and the computational units 140 perform exception processing for the special instruction indicated by the stop code. In some embodiments, the controller 130 handles the exception processing in a later clock cycle than the clock cycle in which the instructions are completed in block 380. In other embodiments, the exception processing is handled in the same clock cycle as in block 380.

Depending on the type of special instruction, different actions may be taken for exception processing. For example, with a flush instruction, each older entry in the ICT 110 may be cleared from the ICT 110 or one or more registers in the memory 150 are cleared during exception processing. With a sync instruction, the processor 100 may wait until all of the older instructions have completed before initiating a younger instruction, fetch any instruction that might have been fetched prior to the instruction, or pause computation to throttle the computational units 140. With a transactional instruction (e.g., $_t$begin, $_t$beginc, $_t$abort, $_t$end) the exception processing may ensure that a series of instructions are handled as a block of concurrent instructions that either successfully complete or abort without affecting the memory 250. In embodiments in which the ICT 110 includes multiple instructions per entry, exception processing may include setting a stop code for another instruction included in the entry.

In some embodiments, method 300 may proceed to block 370 after block 390. In other embodiments, that use ICTs 110 that include more than one instruction in a given entry, method 300 returns to block 360 after handling exception processing for a first special instruction to determine whether an additional special instruction with an outstanding stop code is included in the given entry.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   during a first clock cycle, in response to determining that a given entry in an Instruction Completion Table (ICT) is finalized and is associated with a stop code, completing, according to a program order, instructions included in one or more finalized entries of the ICT located in the ICT before the given entry;
   during a second clock cycle, after completing the instructions, performing exception processing for a special instruction included in the given entry; and
   during a third clock cycle, after processing the special instruction, completing, according to the program order, additional instructions in one or more finalized entries located in the ICT after the given entry.

2. The method of claim 1, wherein the stop code is associated with the given entry in the ICT in response to the special instruction being dispatched for processing.

3. The method of claim 1, wherein the stop code is associated with the given entry in the ICT in response to the special instruction having finished processing.

4. The method of claim 1, wherein the ICT includes multiple instructions in each entry.

5. The method of claim 4, wherein the given entry includes a second special instruction, further comprising:
   during the second clock cycle, after processing the special instruction, setting the stop code based on the second special instruction; and
   during a fourth clock cycle, between the second clock cycle and the third clock cycle, processing the second special instruction and clearing the stop code.

6. The method of claim 4, wherein the given entry is tracked in the ICT with:
   a dispatched status bit, indicating whether all of the multiple instructions included in the given entry have been dispatched or at least one instruction of the multiple instructions included in the given entry has not been dispatched;
   a finished status bit, indicating whether all of the multiple instructions included in the given entry have been finalized or at least one instruction of the multiple instructions included in the given entry has not been finalized; and
   a plurality of stop status bits, indicating whether at least one instruction of the multiple instructions included in the given entry is associated with exception processing and a stop type for the exception processing.

7. The method of claim 1, wherein the special instruction includes one of:
   a flush instruction;
   a sync instruction; and
   a transactional instruction.

8. A system, comprising:
   a computational unit;
   an Instruction Completion Table (ICT), including a plurality of entries;
   a controller, in communication with the computational unit and the ICT, configured to:
   during a first clock cycle, in response to determining that a given entry in an Instruction Completion Table (ICT) is finalized and is associated with a stop code, completing, according to a program order, instructions included in one or more finalized entries of the ICT located in the ICT before the given entry;
   during a second clock cycle, after completing the one or more instructions, perform exception processing for a special instruction included in the given entry; and
   during a third clock cycle, after processing the special instruction, complete older instructions in one or more finalized entries in the ICT after the given entry.

9. The system of claim 8, wherein the stop code is associated with the given entry in the ICT when the special instruction is dispatched for processing.

10. The system of claim 8, wherein the stop code is associated with the given entry in the ICT when the special instruction is ready to complete.

11. The system of claim 8, wherein the ICT includes multiple instructions in each entry.

12. The system of claim 11, wherein the given entry includes a second special instruction, the controller further configured to:
    during the second clock cycle, after processing the special instruction, set the stop code based on the second special instruction; and
    during a fourth clock cycle, between the second clock cycle and the third clock cycle, process the second special instruction and clear the stop code.

13. The system of claim 11, wherein the given entry is tracked in the ICT with:
    a dispatched status bit, indicating whether all of the multiple instructions included in the given entry have been dispatched or at least one instruction of the multiple instructions included in the given entry has not been dispatched;
    a finished status bit, indicating whether all of the multiple instructions included in the given entry have been finalized or at least one instruction of the multiple instructions included in the given entry has not been finalized; and
    a plurality of stop status bits, indicating whether at least one instruction of the multiple instructions included in the given entry is associated with exception processing and a stop type for the exception processing.

14. The system of claim 8, wherein the special instruction includes one of:
    a flush instruction;
    a sync instruction; and
    a transactional instruction.

15. A computer program product for stopping instruction completions using stop codes in an Instruction Completion Table in a microprocessor, the computer program product comprising:
    a computer-readable storage medium having computer-readable program code embodied therewith, the computer-readable program code executable by one or more computer processors to:
        during a first clock cycle, in response to determining that a given entry in an Instruction Completion Table (ICT) is finalized and is associated with a stop code, completing, according to a program order, instructions included in one or more finalized entries of the ICT located in the ICT before the given entry;
        during a second clock cycle, after completing the one or more instructions, perform exception processing for a special instruction included in the given entry; and
        during a third clock cycle, after processing the special instruction, complete older instructions in one or more finalized entries in the ICT after the given entry.

16. The computer program product of claim 15, wherein the stop code is associated with the given entry in the ICT in response to the special instruction being dispatched for processing.

17. The computer program product of claim 15, wherein the stop code is associated with the given entry in the ICT in response to the special instruction having finished processing.

18. The computer program product of claim 15, wherein the ICT includes multiple instructions in each entry.

19. The computer program product of claim 18, wherein the given entry includes a second special instruction, further comprising:
    during the second clock cycle, after processing the special instruction, setting the stop code based on the second special instruction; and
    during a fourth clock cycle, between the second clock cycle and the third clock cycle, processing the second special instruction and clearing the stop code.

20. The computer program product of claim 18, wherein the given entry is tracked in the ICT with:
    a dispatched status bit, indicating whether all of the multiple instructions included in the given entry have been dispatched or at least one instruction of the multiple instructions included in the given entry has not been dispatched;
    a finished status bit, indicating whether all of the multiple instructions included in the given entry have been finalized or at least one instruction of the multiple instructions included in the given entry has not been finalized; and
    a plurality of stop status bits, indicating whether at least one instruction of the multiple instructions included in the given entry is associated with exception processing and a stop type for the exception processing.

\* \* \* \* \*